Patented Mar. 22, 1949

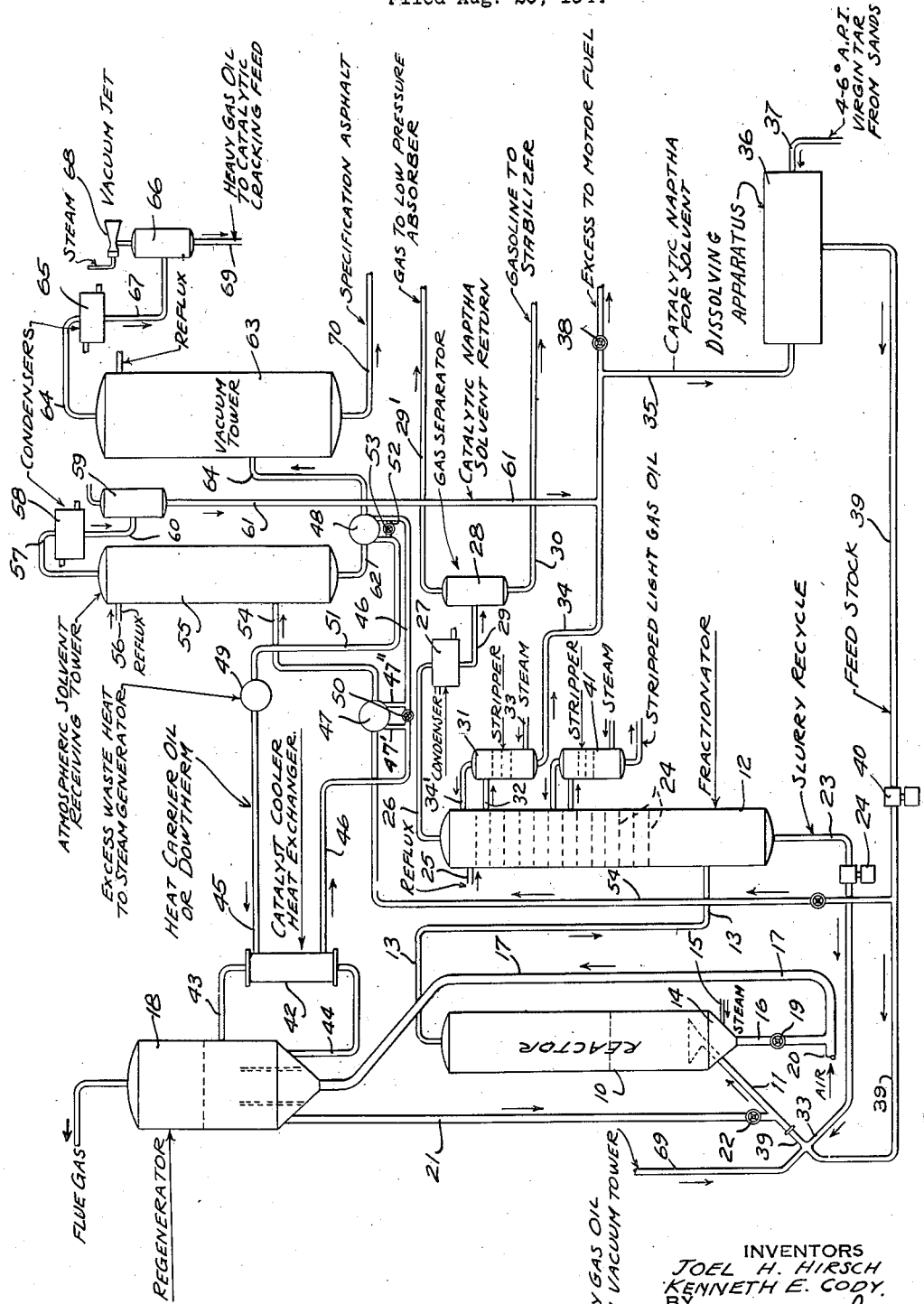

2,464,810

UNITED STATES PATENT OFFICE 2,464,810

CATALYTIC CONVERSION

Joel H. Hirsch, Oakmont, Pa., and Kenneth E. Cody, Elizabeth, N. J., assignors to Foster Wheeler Corporation, New York, N. Y., a corporation of New York Application August 25, 1944, Serial No. 551,145

6 Claims. (Cl. 196—52)

1

This invention relates to catalytic conversion of petroleum oils to motor fuel and more particularly to the catalytic cracking of heavy crude oil, and tar for the production of motor fuel.

Heavy crude petroleum oil, reduced crude petroleum oil, and tar which have low A. P. I. gravities, for example A. P. I. gravities ranging from 4° to 10°, cannot be cracked thermally, due to their low hydrogen content, without adding hydrogen or subtracting carbon during the conversion of the oils to motor fuel. Generally, the cost of hydrogen preparation and hydrogenation equipment is so high that the use of a catalytic hydrogenation process is prohibitive. In processes wherein the carbon is extracted from the heavy crude petroleum oil, reduced crude petroleum oil or tar, a large quantity of coke is produced, the disposal or marketing of which presents a series problem.

The present invention provides a method of and apparatus for the catalytic cracking of heavy crude oil or tar in the production of motor fuel in which method and apparatus a relatively small percent of residual carbon is formed. In the method and apparatus of the present invention, the carbon deposited per unit of catalyst is controlled and distributed over a large amount of catalyst so that no particle of catalyst contains more than a small quantity of carbon. The present invention also provides a fluid catalytic conversion method and apparatus in which the heat generated from catalyst regeneration is utilized and the temperature thereof controlled.

The invention will be understood from the following description when considered in connection with the accompanying drawing forming a part thereof and in which the single figure is a flow diagram of the apparatus of the present invention.

Referring to the drawing, the reference character 10 designates a fluid catalyst reactor having an inlet pipe 11 in which a composite liquid is vaporized by contact with hot catalyst and through which the vapor and catalyst is injected into the reactor. Cracked oil vapors pass overhead in the reactor through cyclones, not shown, for recovery of catalyst fines and into the lower portion of a fractionating tower 12 through a conduit 13. Spent catalyst passes downwardly in the reactor through a steam stripping section 14 at the bottom of the reactor 10 wherein oil vapors are removed from the spent catalyst. Steam is introduced into the stripping section 14 through a steam line 15. A spent catalyst standpipe 16 is connected at one end to the section 14 of the

2 reactor 10 and is in communication at the opposite end with a conduit 17 which conduit is in communication with a catalyst regenerator 18. The standpipe 16 is controlled by slide valve 19. A current of regeneration air which conveys the spent catalyst through the conduit 17 of the regenerator 18 is introduced into the conduit 17 at 20. A regenerated catalyst standpipe 21 communicates with the bottom of the regenerator 18 and the inlet pipe 11 so that regenerated catalyst will flow from the regenerator to said inlet pipe. The standpipe 21 is controlled by the slide valve 22.

A small quantity of the cracked oil vapors flowing from the reactor to the lower portion of the fractionator 12 through the pipe 13 is condensed in the bottom of the fractionator. This condensate, together with any fine catalyst particles which were not separated in the reactor cyclones, is withdrawn from the bottom of the fractionator 12 through a slurry oil conduit 23 by means of a pump 24. The slurry oil conduit 23 is connected to the inlet pipe 11 so that the condensate in the bottom of the fractionator 12 will be pumped to the reactor where the catalyst particles are recovered. The fractionator 12 has vapor and liquid contact apparatus 24 through which vapors from the pipe 13 flow upwardly countercurrent to and in contact with reflux flowing downwardly in the fractionator. Reflux enters the fractionating tower at the top thereof through the pipe 25. Vapors pass overhead from the fractionator 12 through a conduit 26 which is in communication with a condenser 27. Condensate, together with any gas vapors therein, flows from the condenser to a gas separator 28 through a line 29. Gas passes from the top of the gas separator 28 through a conduit 29' which communicates with gas recovery apparatus, not shown, wherein light gasoline components are recovered. Catalytic gasoline is passed from the bottom of the gas separator 28 through a pipe 30 to a stabilizer, not shown, for the removal of fixed gases so that a gasoline of proper vapor pressure specification may be produced.

As shown, two side stream strippers are employed with the fractionator 12. The stripper 31 is in communication with the upper part of the fractionating tower 12 through a pipe 32 through which a fraction is withdrawn from the tower and is passed into the stripper. The fraction withdrawn preferably is a 300° to 400° E. P. catalytic naphtha which is stripped in the stripper 31 by steam which enters the stripper through a pipe 33. Vapors pass overhead from the stripper 31 into the fractionator 12 through a pipe 34. Naphtha flows from the stripper 31 through a conduit 34 from which a portion thereof is passed into a solvent conduit 35 whence it is conducted to tar dissolving apparatus 36 wherein the naphtha is used to dissolve a heavy residual oil charge which enters the apparatus 36 through an inlet conduit 37. Catalytic naphtha not required as a solvent flows in the conduit 34 through the valve 38 and may be used as a blending stock for motor fuel. The dissolving apparatus 36 is in communication with the inlet pipe 11 of the reactor through a feed stock conduit 39. A solution of tar in catalytic naphtha is withdrawn from the dissolving apparatus and fed to the inlet pipe 11 by means of a pump 40. A light gas oil is withdrawn from the fractionator 12 at an intermediate point through the side stream stripper 41 which is similar to the side stream stripper 31.

A high temperature is created in the regenerator 18 in burning from the spent catalyst the carbon or coke deposited thereon which high temperature heats the catalyst to such a degree that cooling thereof is necessary to control the temperature in the regenerator. As shown the catalyst cooler 42, which is used as a heat exchanger is provided. The catalyst cooler may be used as a heat exchanger for the generation of steam or any desired purpose or, as shown, may be used to supply heat at 47 and 48 for the production of asphalt and naphtha from the solution of tar in naphtha from apparatus 36. Catalyst to be cooled flows from the regenerator 18 through the conduit 43 into the heat exchanger 42. The cooled catalyst flows from the heat exchanger 42 into the regenerator 18 through the cooled catalyst conduit 44. A fluid such as Dowtherm or heat carrier oil which is heated in the heat exchanger 42 and which, in turn, cools the catalyst flowing through the heat exchanger enters the heat exchanger 42 through a line 45. As shown, the heated medium flows from the heat exchanger 42 through a line 46 into which line is connected heat exchangers 47 and 48. Heated fluid from the conduit 46 flows into the heat exchanger 47 through an inlet pipe 47' and passes from the heat exchanger 47 through an outlet pipe 47". The amount of fluid passing into the heat exchanger 47 is controlled by the valve 50. Likewise, heated fluid passes from the line 46 into the heat exchanger 48 and flows from the heat exchanger 48 through the conduit 51 into a heat exchanger 49. The by-pass conduit 52 which is controlled by a valve 53 is connected between the conduits 51 and 46 so that the amount of fluid flowing into the heat exchanger 48 may be controlled. The heated fluid flowing into the heat exchanger 49 may be used for the generation of steam. Cooled fluid flows into the line 45 from the heat exchanger 49.

As shown, a conduit 54 is in communication at one end thereof with the feed stock line 39 and at the other end with an atmospheric solvent receiving tower 55. The conduit 54 communicates with tower 55 through the heat exchanger 47 wherein feed stock flowing from the line 39 through the conduit 54 is vaporized. Vapor flowing into the tower 55 passes upwardly in the tower countercurrent to and in contact with reflux passing downwardly in the tower which reflux enters the tower through the inlet pipe 56. The vapor and reflux are brought into intimate contact with one another in the tower by means of vapor and liquid contact apparatus not shown. Vapors pass overhead from the tower 55 through the line 57 into a condenser 58 which condenser communicates with a gas separator 59 through a pipe 60 in which condensate and gases from the condenser pass into the gas separator 59. A pipe 61 connects the gas separator 59 with the catalytic naphtha line 34 and conducts the naphtha recovered from the tar solvent naphtha solution to the line 34 whence it flows to the dissolving apparatus 36 through the lines 34 and 35 with the catalytic naphtha flowing through the conduit 34 from the side stream stripper 31. The bottoms fraction from the tower 55 is passed from the tower through a pipe 62 into the heat exchanger 48 wherein it is vaporized and the vapor conducted to a vacuum tower 63 through a line 64. Heavy gas oil vapors pass overhead from the vacuum tower 63 through a pipe 64 into a condenser 65. The condensate and any remaining vapors are passed from the condenser 65 into a gas separator 66 through conduit 67 in which separator a vacuum is maintained by means of a vacuum jet 68. Heavy gas oil from the separator 66 is fed to the inlet pipe 11 of the reactor 10 through an oil line 69, while asphalt is withdrawn from the tower 63 through the pipe 70.

In operation, virgin tar from sand, or heavy crude oil, having very low hydrogen content, the A. P. I. gravities of which range approximately from 4° to 10°, is fed through inlet conduit 37 to the tar or oil dissolving apparatus 36 wherein it is dissolved in 300° to 400° E. P. naphtha which is conducted to apparatus 36 through the solvent conduit 35. The solution of tar in naphtha is pumped from the apparatus 36 through the feed stock conduit 39 by the pump 40. Heavy gas oil from the vacuum tower 63 and slurry oil from the fractionator 12 flow into the feed stock conduit 39 through the oil line 69 and slurry oil conduit 23 respectively. The mixture of heavy gas oil, slurry oil, and the solution of tar and naphtha flows from the feed stock conduit 39 into the inlet pipe 11 wherein the mixture is brought into contact with hot catalyst flowing from the regenerator 18 through the regenerated catalyst standpipe 21 into the feed pipe 11. Since the catalyst ordinarily is at a temperature of approximately 1100° F., the mixture is immediately vaporized and the vapor injected into the reactor 10. In the reactor 10, the heaviest material of the mixture injected into the reactor 10 through the pipe 11 is deposited on the catalyst. The spent catalyst then passes through the stripping section 14 of the reactor wherein oil vapors are removed therefrom and thereafter flows in the spent catalyst standpipe 16 to the conduit 17 in which it is conveyed by a current of regeneration air to the regenerator 18. Carbon is burned from the spent catalyst in the regenerator 18. The flue gas from the regenerator passes overhead from the regenerator and into apparatus, not shown, for the removal of catalyst fines from said gas. The amount of heat required to burn the carbon from the catalyst will heat the catalyst to such a temperature that a catalyst cooler is required to control the temperature in the regenerator 18. Hot catalyst is therefore passed from the regenerator 18 through the conduit 43 into the heat exchanger or catalyst cooler 42. The catalyst is cooled by bringing it in heat exchange relationship with a cooling fluid such as Dowtherm or heat carrier oil which flows into the heat exchanger through the line 45. The heated fluid passes out of the heat exchanger 42 through the line 46 while the cooled catalyst flows into the regenerator 18 through the cooled catalyst conduit 44.

Catalytically cracked vapors pass overhead from the reactor into the lower portion of the fractionating tower 12 through the conduit 13. These vapors are fractionated in the fractionating tower, as hereinbefore described. The overhead gases pass through condenser 27 into the gas separator 28 from which gas is conducted through the conduit 29 to a low pressure absorber, not shown, and gasoline is passed to a stabilizer, not shown, through the pipe 30. Naphtha is withdrawn from the stripper 31 which is in communication with the fractionating tower 12 as hereinbefore described. The naphtha is preferably a 300° to 400° E. P. catalytic naphtha and is conveyed through the pipe 34 and solvent conduit 35 to the apparatus 36. The portion of the naphtha not used as a solvent passes through the valve 38 and may be employed as a blending stock in motor fuel.

As shown, the heat from the catalyst cooled in the heat exchanger 42 is used to convert a portion of the tar-naphtha solution from the apparatus 36 to a solvent naphtha which is used to dissolve the tar or heavy crude oil fed to the tar dissolving apparatus 36. The heat extracted from the catalyst in the heat exchanger 42 may be used for generating steam or for other purposes if so desired. As shown, a portion of the solution of tar in naphtha flowing through the feed stock conduit 39 is passed into the conduit 54. The solution flowing through the conduit 54 is brought into heat exchange relationship in the heat exchanger 47 with the heated fluid flowing from the heat exchanger 42 through the line 46. The solution is thereby vaporized and the vapors passed into the solvent receiving tower 55. As hereinbefore set forth, the vapors passing overhead from the tower 55 through the line 57 flow through the condenser 58 and gas separator 59. Catalytic naphtha is withdrawn from the gas separator 59 through the pipe 61 whence it flows into the conduit 34 thence with the naphtha from the stripper 31 into the solvent conduit 35 to the tar dissolving apparatus 36. The bottoms fraction from the tower 55 flows through the pipe 62 into the heat exchanger 48 wherein it is vaporized by being brought into heat exchange relationship with heated fluid from the heat exchanger 42. The vapor from the heat exchanger 48 is passed into the vacuum tower 63 from which asphalt formed therein is removed from the bottom through the pipe 70. Vapors are removed overhead from the tower 63 through the line 64 and pass through the condenser 65 into the gas separator 66, as hereinbefore described. Heavy gas oil from the separator 66 flows through the conduit 69 into the feed stock conduit 39 wherein it mixes with the solution of tar in naphtha and the slurry oil from the fractionator 12.

With the present invention, the amount of carbon deposited per unit of catalyst is controlled by the concentration of tar or heavy crude oil in solvent naphtha. Thus, if for some types of tar or heavy crude oil a feed stock mixture containing 50% tar or crude oil and 50% solvent naphtha deposits too much carbon on the catalyst so that the heat generated in the regenerator cannot be economically utilized, it is possible to reduce the amount of carbon by using lower concentration of tar or heavy crude oil. For example, 30% tar or crude oil might be used with 70% solvent naphtha. The optimum operation would be one in which the highest concentration of tar or heavy crude oil in solvent naphtha were used, consistent with maintenance of fluid conditions that would not cause coking of the reactor inlet line and consistent with the ability to utilize the heat generated from catalyst regeneration.

It will be understood that the form of the invention disclosed is a preferred form only and that changes may be made in the apparatus and in the several steps of the method and in their sequence without departing from the principles of the invention. Accordingly, the invention is not to be limited except by the scope of the appended claims.

What is claimed is:

1. A process for the conversion of hydrocarbon oil of low hydrogen content which comprises dissolving said oil in a naphtha solvent, flowing a portion at least of the solution of oil in solvent into contact with a hot catalyst thereby vaporizing the solution, passing the hot catalyst and vapor into a reacting zone wherein carbon from said solution is deposited on the catalyst, fractionating vaporous conversion products from the reacting zone in a fractionating zone, removing a naphtha fraction from the fractionating zone, using a part at least of said naphtha fraction as solvent for said dissolving of the hydrocarbon oil, and controlling the concentration of said hydrocarbon oil in the solvent to control the amount of carbon deposited on the catalyst in the reacting zone.

2. A process for the conversion of hydrocarbon oil of low hydrogen content which comprises dissolving said oil in a naphtha solvent, flowing a portion at least of the solution of oil in solvent into contact with a hot catalyst thereby vaporizing the solution, passing the hot catalyst and vapor into a reacting zone wherein carbon from said solution is deposited on the catalyst, fractionating in a fractionating zone vaporous conversion products resulting from said cracking, removing a naphtha fraction from the fractionating zone, using a part at least of said naptha fraction as solvent for said dissolving of the hydrocarbon oil, removing from the fractionating zone slurry comprising condensate of said varporous products with catalyst therein from said catalytic cracking zone, introducing said slurry from the fractionating zone into the solution of hydrocarbon oil and naphtha, and controlling the concentration of said hydrocarbon oil in the solvent to control the amount of carbon deposited on the catalyst in the reacting zone.

3. A process for the conversion of hydrocarbon oil which comprises dissolving with a naphtha solvent a hydrocarbon oil of low hydrogen content having a gravity range of substantially 4° to 10° A. P. I., flowing at least a part of the solution of oil in solvent into contact with hot catalyst from a regenerating zone thereby vaporizing the solution, passing the hot catalyst and vapor into a reacting zone wherein the heavier material from said solution is deposited on the catalyst, cracking the deposited material in the reacting zone, regenerating the catalyst used in cracking said solution by burning therefrom in the regenerating zone carbon deposited on the catalyst in the reacting zone, controlling the temperture in the regenerating zone by passing hot catalyst therefrom in heat exchange relationship with a heat absorbing medium, fractionating vaporous conversion products from the reacting zone in a fractionating zone, removing a naphtha fraction from the fractionating zone, using a part at least of said naphtha fraction as solvent for said dissolving of the hydrocarbon oil, and controlling the concentration of said oil in the solvent to thereby control the amount of carbon deposited on the catalyst in the catalytic cracking of the solution.

4. A process for the conversion of hydrocarbon oil which comprises dissolving with a naphtha solvent a hydrocarbon oil of low hydrogen content having a gravity range of substantially 4° to 10° A. P. I., flowing at least a part of the solution of oil in solvent into contact with hot catalyst from a regenerating zone thereby vaporizing the solution, passing the hot catalyst and vapor into a reacting zone wherein the heavier material from said solution is deposited on the catalyst, cracking the deposited material in the reacting zone, regenerating the catalyst used in cracking said solution by burning therefrom in the regenerating zone material deposited on the catalyst as a result of said cracking in the reacting zone, controlling the temperature in the regenerating zone by passing hot catalyst therefrom in heat exchange relationship with a heat absorbing medium, fractionating vaporous conversion products from the reacting zone in a fractionating zone, removing a naphtha fraction from the fractionating zone, using a part at least of said naphtha fraction as solvent for said dissolving of the hydrocarbon oil, removing from the fractionating zone slurry comprising condensate of said vaporous products with catalyst therein, from the reacting zone, introducing said slurry from the fractionating zone into the solution of hyrocarbon oil and naphtha, and controlling the concentration of said oil in the solvent to thereby control the amount of carbon deposited on the catalyst in the catalytic cracking of the solution.

5. A process for the conversion of hydrocarbon oil which comprises dissolving in a naphtha solvent prior to refining said oil a hydrocarbon oil of low hydrogen content having a gravity range of substantially 4° to 10° A. P. I., vaporizing the solution of said oil and naphtha by flowing said solution into contact with a hot catalyst before passage of said solution and catalyst to a reaction zone, passing the hot catalyst and vapor into a reacting zone wherein carbon from said solution is deposited on the catalyst, fractionating vaporous conversion products from the reacting zone in a fractionating zone, removing a naphtha fraction from the fractionating zone, using a part at least of said naphtha fraction as solvent for said dissolving of the hydrocarbon oil, and controlling the concentration of said hydrocarbon oil in the solvent to control the amount of carbon deposited on the catalyst in the reacting zone.

6. A process for the conversion of hydrocarbon oil of low hydrogen content which comprises dissolving said oil in a naphtha solvent, vaporizing the solution of said oil and naphtha by flowing said solution into contact with a hot regenerated catalyst from a regenerating zone, passing the hot catalyst and vapor into a reacting zone wherein carbon from said solution is deposited on the catalyst, regenerating catalyst used in the reacting zone by burning therefrom in said regenerating zone residue deposited thereon in said reacting zone, fractionating vaporous conversion products from the reacting zone in a fractionating zone, removing a naphtha fraction from the fractionating zone, using a part at least of said naphtha fraction as solvent for said dissolving of the hydrocarbon oil, and controlling the concentration of said hydrocarbon oil in the solvent to control the amount of carbon deposited on the catalyst in the reacting zone.

JOEL H. HIRSCH.
KENNETH E. CODY.

REFERENCES CITED

The following references are of record in the file of this patent:

UNITED STATES PATENTS

| Number | Name | Date |
|---|---|---|
| 2,027,862 | Goodwin et al. | Jan. 14, 1936 |
| 2,161,247 | Dearborn | June 6, 1939 |
| 2,197,460 | Adams | Apr. 16, 1940 |
| 2,290,845 | Voorhees | July 21, 1942 |
| 2,291,234 | Kassel | July 28, 1942 |
| 2,327,175 | Conn | Aug. 17, 1943 |
| 2,337,640 | Burgin | Dec. 28, 1943 |
| 2,341,193 | Scheineman | Feb. 8, 1944 |
| 2,353,731 | Kanhofer | Jan. 18, 1944 |
| 2,356,697 | Rial | Aug. 22, 1944 |
| 2,360,349 | Kassel | Oct. 17, 1944 |
| 2,379,711 | Hemminger | July 3, 1945 |
| 2,385,325 | Bailey | Sept. 25, 1945 |
| 2,396,758 | Stratford | Mar. 19, 1946 |
| 2,402,893 | Hulse | June 25, 1946 |